United States Patent [19]
Tsuchiya

[11] Patent Number: 5,524,003
[45] Date of Patent: Jun. 4, 1996

[54] DISK-DRIVE APPARATUS WAITH RATTLE-PREVENTING CARTRIDGE MAGAZINE

[75] Inventor: Tatsuhiko Tsuchiya, Iwaki, Japan

[73] Assignee: Alpine Electronics, Inc., Tokyo, Japan

[21] Appl. No.: 335,291

[22] Filed: Nov. 7, 1994

[30] Foreign Application Priority Data

Nov. 16, 1993 [JP] Japan .................................. 5-309736

[51] Int. Cl.$^6$ .......................... G11B 17/06; G11B 17/08; G11B 23/00; G11B 25/00
[52] U.S. Cl. .............. 369/191; 369/192; 369/34; 369/263; 369/178
[58] Field of Search ...................... 369/191, 192, 369/178, 77.1, 77.2, 36, 34, 75.2, 263; 360/99.03, 99.07, 99.12, 98.01, 98.08, 98.02

[56] References Cited

U.S. PATENT DOCUMENTS

| | | | |
|---|---|---|---|
| 1,266,767 | 5/1918 | Brosius | 369/191 |
| 4,815,065 | 3/1989 | Rouws | 369/77.2 |
| 5,062,092 | 10/1991 | Siryj et al. | |
| 5,084,859 | 1/1992 | Ishibashi et al. | 369/178 |
| 5,123,000 | 6/1992 | Fitzgerald et al. | |
| 5,142,523 | 8/1992 | Kamoshita | 369/75.2 |

*Primary Examiner*—Stuart S. Levy
*Assistant Examiner*—Adriana Giordana
*Attorney, Agent, or Firm*—Guy W. Shoup; Patrick T. Bever

[57] ABSTRACT

A selective disk-drive apparatus in which a plurality of cartridges are stored, each cartridge containing a disk, the apparatus including a plurality of stacked partition members which define receptacle areas therebetween, each of the partition members including a pressing member which is positioned to be received within an opening in a lower wall of the cartridge to press the disk against the inside surface of an upper wall of the cartridge to prevent the disk from rattling within the cartridge. A lowermost one of the partition members is biased upwards by a spring, and each partition member includes lugs which provide a minimum spacing between the partition members. In one embodiment the partition members are pivotally connected, and in a second embodiment, the partition members slide in vertical grooves. When a cartridge is inserted between two partition members, the cartridge presses against and slides over the pressing member, thereby forcing the lower partition member downward against the biasing force of the spring. When the cartridge is fully inserted, the pressing member is received in the opening of the cartridge, thereby allowing the lower partition to move upward. When there is no cartridge between two partition members, the minimum spacing between the partition members is maintained by contact between the lugs.

19 Claims, 6 Drawing Sheets

DISK-DRIVE APPARATUS WAITH RATTLE-PREVENTING CARTRIDGE MAGAZINE

BACKGROUND OF THE INVENTION

1. Field of the Invention

The present invention relates to a selective disk-drive apparatus into which a plurality of disk-containing cartridges are either inserted individually, or inserted together using a magazine capable of storing a plurality of cartridges therein. Particularly, the present invention relates to a selective disk-drive apparatus for supporting cartridges within a minimum space while preventing rattling of the disk contained in each cartridge.

2. Description of the Related Art

FIG. 8(A) is a plan view of a disk-containing cartridge assembly, FIG. 8(B) is an end view thereof, and FIG. 9 is a sectional view of the cartridge showing the disk contained therein.

The disk-containing cartridge assembly shown in FIGS. 8(A) and 8(B) is known as a minidisk MD, and includes a magneto-optic recording-type disk D contained in a cartridge C. As shown in FIG. 9, a circular hole Ca is formed substantially in the center of the lower surface of the cartridge C, and a centering member Dc, constituted by a metallic plate and located in the center of the disk D, is exposed through the hole Ca. A mark M which indicates a disk insertion direction is formed on the surface of the cartridge C. The direction indicated by the mark M (upward direction in FIG. 8(A)) indicates the proper direction in which the cartridge is inserted into a selective disk apparatus. Of the four sides of the cartridge C, the upper, left and lower sides in FIG. 8(A) are all spaced by the same distance B from the center O of the hole Ca, while the distance A between the right side and the center O of the hole Ca is longer than the distance B. That is, the center O of the hole Ca is biased in the direction perpendicular to the normal insertion direction (left-hand direction in FIG. 8(A)).

A turntable T, which is disposed on a disk driving portion of a selective disk-drive apparatus, is provided with a magnet, and the centering member Dc is fitted on the turntable T by virtue of magnetic attraction. The cartridge C is provided with a shutter S which is slidably mounted over one or more windows formed through the walls of the cartridge C. By sliding the shutter S, the windows are uncovered, thereby exposing the lower surface of the disk D through the lower wall of the cartridge C (when the disk is used for playback only), or both the upper and lower surfaces of the disk D through the upper and lower walls of the cartridge C (when the disk is used both for recording and playback).

FIG. 10 is a sectional view showing an example of a selective disk-drive apparatus into which a plurality of cartridges C are loaded, the cartridges C corresponding to the minidisks MD described above.

A housing 1 of the selective disk-drive apparatus shown in FIG. 10 is of the so-called 1 DIN size, which can be received within the mounting space provided for a car radio or the like in the interior console panel of an automobile. A nose portion 2 is located on the front side of the housing 1. The nose portion 2 defines a cartridge insertion opening 2a, and typically includes operating members such as key switches (not shown).

A cartridge receiving box 3 is provided in a rear position within the housing 1. The cartridge receiving box 3 is partitioned by horizontally-extending partition places 3a to form three cartridge parallel receptacle areas A1, A2 and A3.

As shown in FIG. 10, a disk driving unit 4 is located in the housing 1 close to the nose portion 2, the disk driving unit 4 being adapted to move vertically. The disk driving unit 4 includes a spindle motor 4a, for driving a turntable, and an optical head. The disk driving unit 4 is further provided with a transfer mechanism for moving the cartridges C in the horizontal direction (see FIG. 10).

When the cartridge C is inserted through the insertion opening 2a, the disk driving unit 4 is in a raised position, and the cartridge C is pulled horizontally (to the right in FIG. 10) into the housing 1 by the transfer mechanism (not shown) provided on the disk driving unit 4. Next, the disk driving unit 4 moves vertically downward to a position opposed to an unoccupied one of the receptacle areas A1, A2 and A3, and the cartridge C is then inserted horizontally into the unoccupied receptacle area. During a playback operation, a selected cartridge C is pulled out from its associated receptacle area by means of the transfer mechanism on the disk driving unit 4, then the disk D contained in the selected cartridge C is fitted on the turntable and is driven thereby.

As shown in FIG. 9, to allow rotation of the disk D within the cartridge C, a clearance is provided between the disk D and the cartridge C such that the disk D is somewhat vertically movable within the cartridge C. As such, when the automobile runs with plural cartridges C stored in the cartridge receiving box 3, vibrations of the automobile body are transmitted to the cartridges C in the housing, causing the disks D to vibrate against the walls of the cartridges C, thereby creating a rattling noise in the interior of the automobile.

In the selective disk-drive apparatus shown in FIG. 10, the total height of the housing 1 is determined by the standard 1 DIN size. Further, because the disk driving unit 4 moves up and down within the housing 1 and carries the spindle motor 4a and an optical head, the disk driving unit 4 requires a predetermined portion H2 of the total height of the housing 1. Consequently, when the disk driving unit 4 moves to its lowest position as indicated with hidden (dashed) lines in FIG. 10, and the loading or removal of the cartridge C is performed with respect to the lowest receptacle area A1, the disk driving unit 4 is entirely located below the cartridge receiving box 3. For this reason, it is necessary that the height of the box 3 be limited to thereby provide an extra space of height H3 below the box 3.

Accordingly, the height H1 of the cartridge receiving box 3 must be within the height H4 and entirely above the height H3 in the housing 1. As mentioned above, since the thickness of each partition place 3a in the box 3 is large, the height H1 of the box 3 becomes large, and hence a limited number of cartridges C can be received within the box 3. If each partition plate 3a is required to have a thickness of 3 mm or so, then in the case of a minidisk MD type cartridge C, the upper limit number of such cartridges which can be received within the cartridge receiving box 3 is three.

SUMMARY OF THE INVENTION

It is the object of the present invention to provide a selective disk-drive apparatus capable of solving the above-mentioned problem and wherein the partitioned space between adjacent cartridge receiving areas is made as thin as possible to permit a larger number of cartridges to be received within the limited interior space of the housing and which can prevent rattling of the disk contained in each cartridge.

The selective disk-drive apparatus according to the present invention is characterized by including plural stages of receptacle areas, each receptacle area storing a cartridge, a disk driving portion for selecting the cartridge stored in any of the receptacle areas and driving the disk contained therein, partition members each positioned between adjacent receptacle areas and movable such that the spacing between adjacent partition members becomes wider, a pressing portion provided in each partition member for securing the disk contained in each cartridge, a space setting member provided on each partition member, and a biasing member for urging the partition members in a direction in which the space setting member of adjacent partition members come into abutment with each other.

According to the above means, when no cartridges are stored in the receptacle areas, the spacing between adjacent partition members is set by abutment of the respective space setting members. When a cartridge is loaded into or removed from any of the receptacle areas, the bottom of the cartridge moves over the pressing portion of the corresponding partition member, so that the partition member moves downward in the space widening direction. In a completely received state of a cartridge in any of the receptacle areas, the corresponding partition member is urged toward the cartridge by means of the biasing member and the disk contained in the cartridge is pressed by the pressing portion of the partition member, whereby rattling of the disk in the cartridge is prevented.

DETAILED DESCRIPTION OF THE PREFERRED EMBODIMENTS

Embodiments of the present invention will be described in detail hereinunder with reference to the accompanying drawings.

Figure 11:
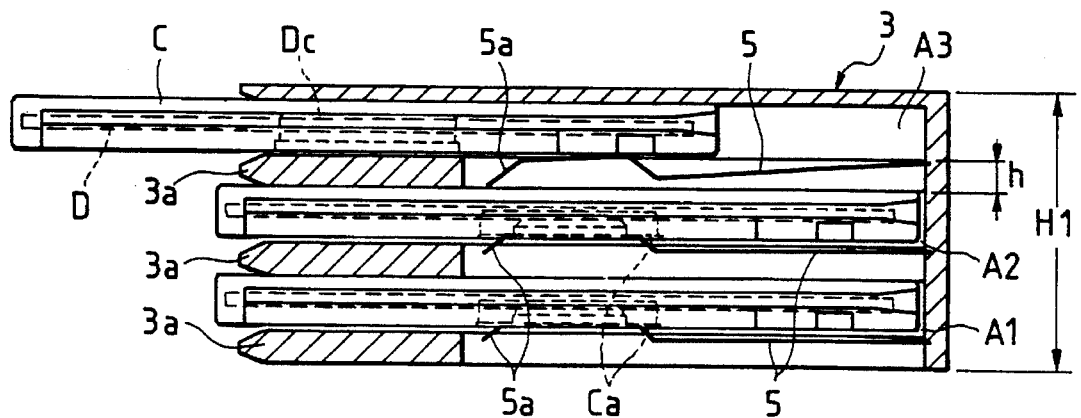
FIG. 11 is a side view of a cartridge receiving box including a plate spring for securing disks within their associated cartridges.

FIG. 11 shows a cartridge receiving box which can be mounted within a selective disk-drive apparatus. To prevent the rattling noise, the structure as shown in FIG. 11 includes plate springs 5 provided in each partition plate 3a of the cartridge receiving box 3, and a pressing portion 5a formed at the front end of the plate spring 5. The pressing portions 5a are positioned to be received within the hole Ca of a cartridge C when the cartridge C is received in one of the receptacle areas A1, A2 or A3, the pressing portion 5a urging the centering member Dc upward, thereby pushing the disk D against the inner surface of the upper wall of the cartridge (see FIG. 9).

In the structure shown in FIG. 11, however, the plate springs 5 bend downward when the cartridges C are loaded into or removed from the receptacle area A1, A2 or A3. Therefore, it is necessary that clearances (indicated by thicknesses h) are provided for the bending of the plate springs 5. Consequently, when the plate springs 5 are provided as shown in FIG. 11, the disks D are prevented from rattling within the cartridges C, but the overall height of the cartridge receiving box cannot be reduced.

Figure 1:
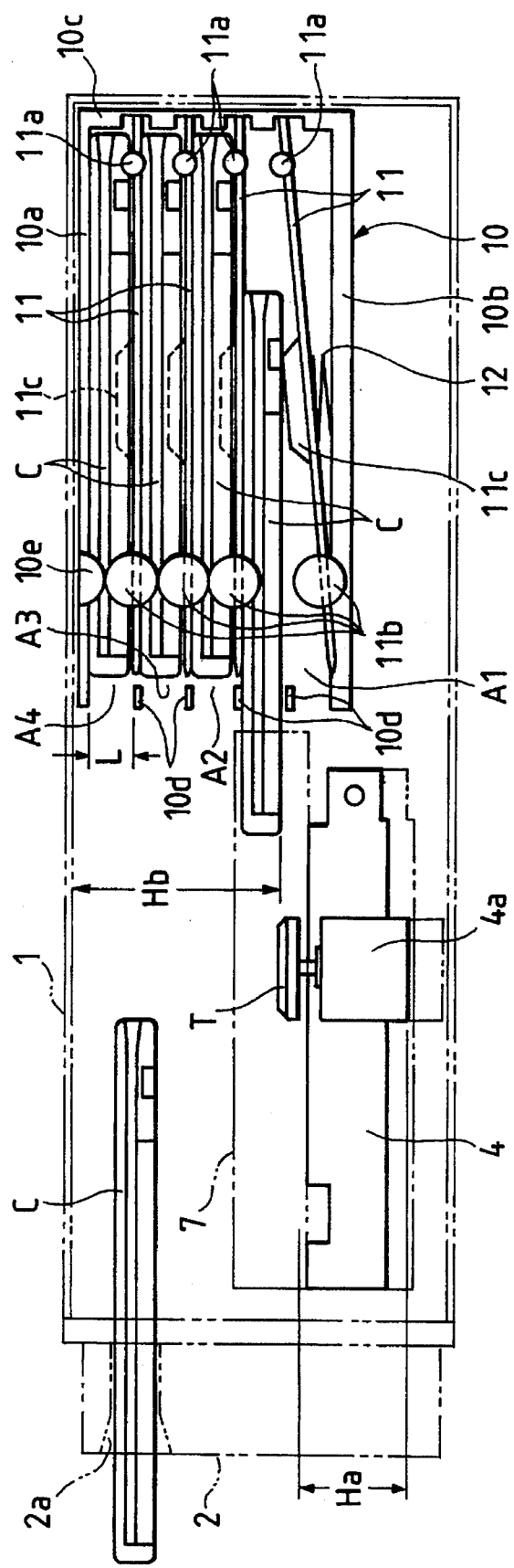
FIG. 1 is a sectional view showing an entire structure of a selective disk-drive apparatus according to an embodiment of the present invention.
Figure 2:
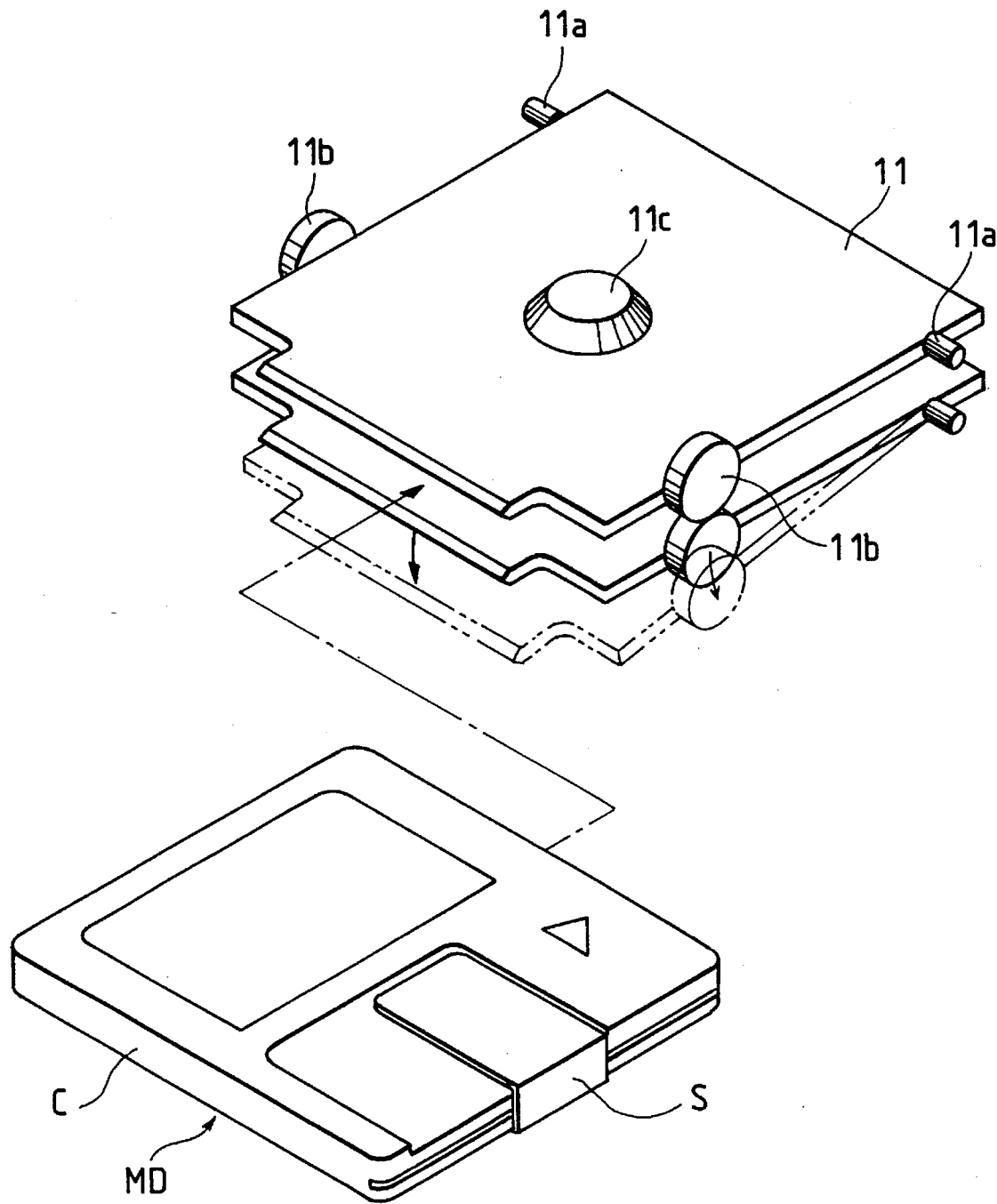
FIG. 2 is a perspective view showing the structure of partition members of a magazine.
Figure 3:
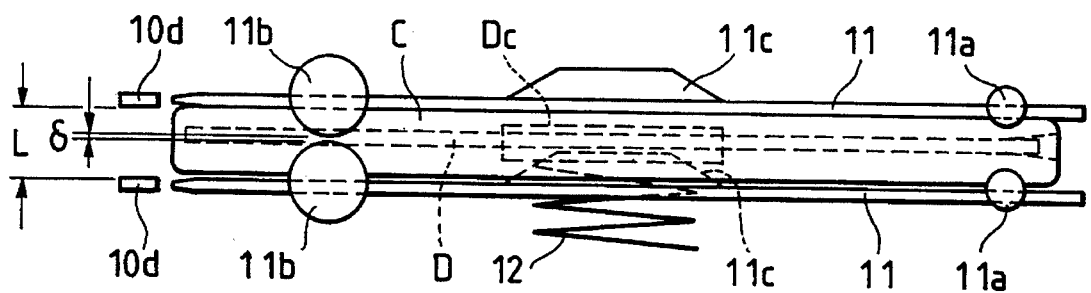
FIG. 3 is a side view showing a spacing between partition members.
Figure 4:
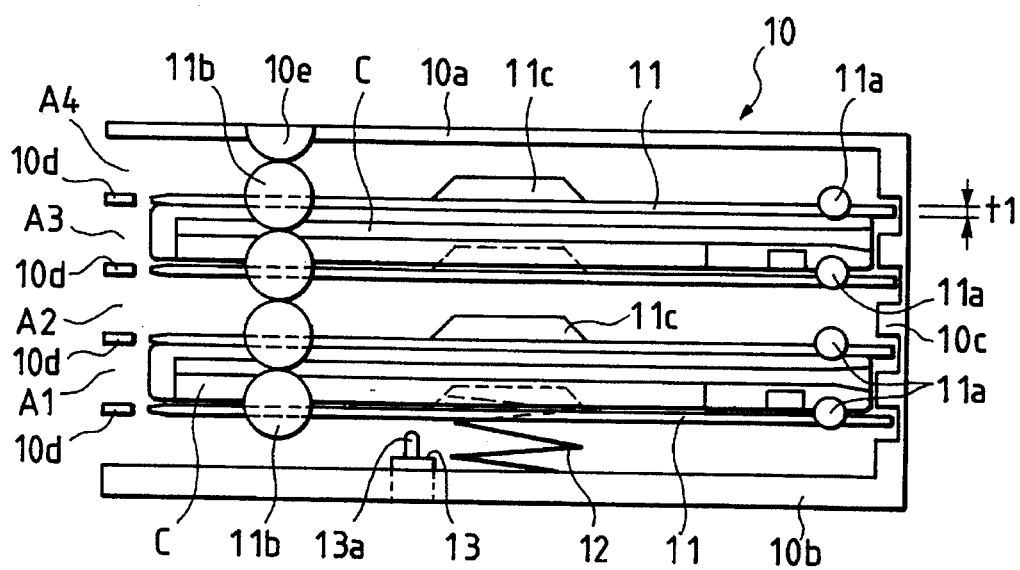
FIG. 4 is a side view showing a cartridge receiving box in a state in which the cartridge loading or unloading operation is not performed.
Figure 5:
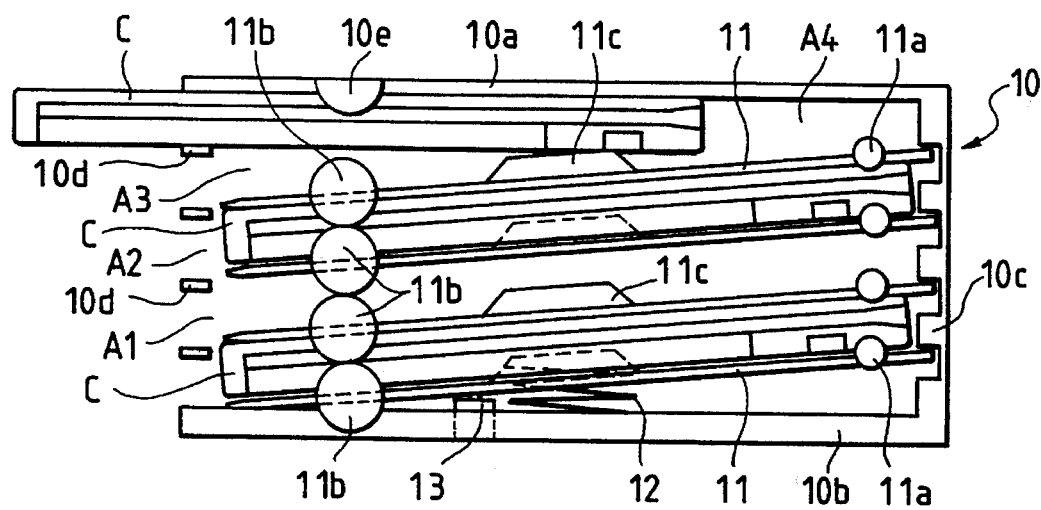
FIG. 5 is a side view of the cartridge receiving box in a state in which the cartridge loading or unloading operation is being performed.
Figure 6:
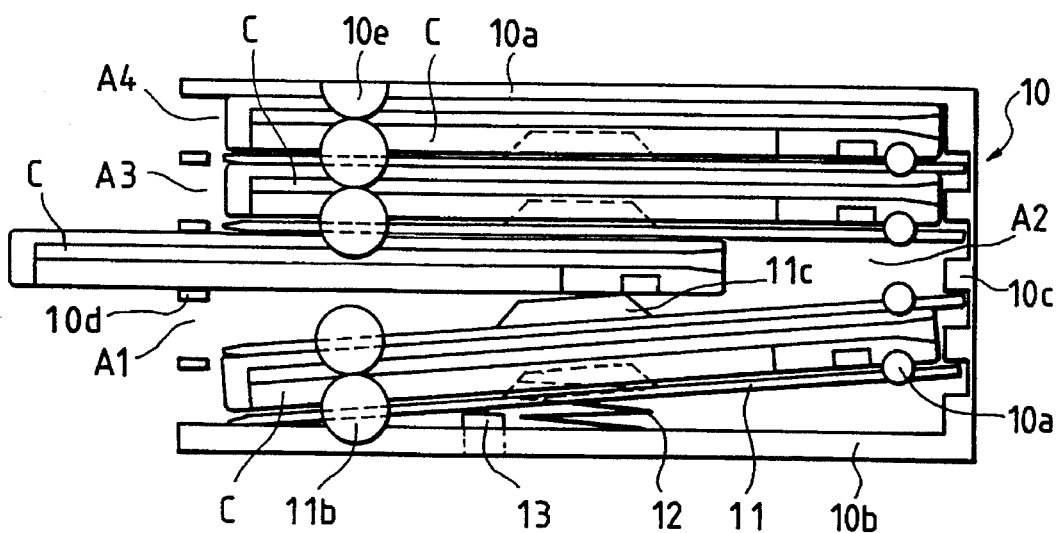
FIG. 6 is a side view of the cartridge receiving box in a state in which the cartridge loading or unloading operation is being performed.

FIGS. 1–6 show a first preferred embodiment of a selective disk-drive apparatus embodying the present invention, wherein FIG. 1 is a section view of the selective disk-drive apparatus, FIG. 2 is a perspective view showing the structure of a partition member, FIG. 3 is a partial side view explaining the spacing between partition members, and FIGS. 4 to 6 are side views each showing a cartridge loaded state or cartridge loading or unloading operation.

Figure 10:
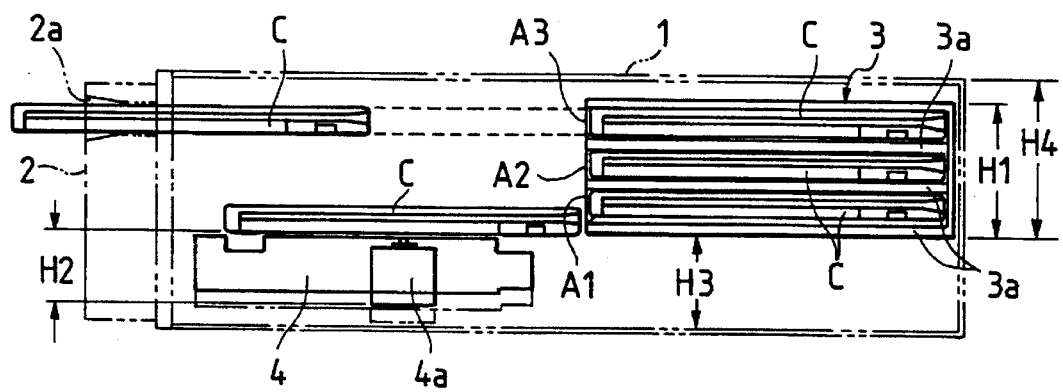
FIG. 10 is a sectional view of a conventional selective disk-drive apparatus.

The selective disk-drive apparatus shown in FIG. 1 has a structure similar to that shown in FIG. 10. A nose portion 2 is provided on the front side of a housing 1, and an insertion opening 2a for a cartridge C is formed in the nose portion 2.

Within the housing 1, a cartridge receiving box 10 is located in an upper portion near the rear side. Four cartridge receptacle areas A1, A2, A3 and A4 are formed within the cartridge receiving box 10.

Within the housing 1 and near the nose portion 2 is provided a disk driving unit 4. The disk driving unit 4 can be moved up and down within the housing 1 by means of a drive mechanism for vertical movement (not shown). The disk driving unit 4 includes a turntable T, a spindle motor 4a for rotating the turntable, and an optical head.

Integrally provided on the disk driving unit 4 is a transfer mechanism 7, which has a mechanism for pulling cartridges, which are inserted horizontally through the insertion opening 2a, into the housing 1 when the disk driving unit 4 in a raised position opposed to the insertion opening 2a. The transfer mechanism 7 further includes a mechanism for pushing the cartridge into a selected (unoccupied) one of the receptacle areas A1 to A4 when the transfer mechanism assumes a vertical position opposed to the selected receptacle area, a mechanism for removing the cartridge from any of the receptacle areas A1 to A4, and a mechanism for moving the cartridge C up and down to attach or detach a centering member Dc (see FIG. 9) to or from the turntable T. A mechanism for opening a shutter S of the cartridge C is also provided on the transfer mechanism 7.

The cartridge receiving box 10 has a ceiling plate 10a, a bottom plate 10b, a back plate 10c and both side plates disposed in spaced relation from each other in the direction perpendicular to the paper surface in FIG. 1. The front side of the cartridge receiving box 10 is open, and in this opening are provided four partition plates 10d in such a manner that the spacing between the top partition plate 10d and the ceiling plate 10a, and the spacing L between adjacent partition plates 10d, are each slightly larger than the thickness of the cartridge C.

Within the cartridge receiving box 10 are provided four partition members 11 in such a manner that the spacing between adjacent partition members 11 is almost equal to the spacing L between adjacent partition plates 10d when the cartridge loading or unloading operation is not performed.

As shown in FIG. 2, each partition member 11 is in the shape of a plate, and on both sides of its rear end portion, or base portion, are integrally provided support shafts 11a, 11a, which are supported pivotally (rotatably) by both side plates of the cartridge receiving box 10. Lugs 11b, 11b are integrally formed on both sides of the front portion of each partition member 11 for maintaining a minimum distance between adjacent partition members 11 and between the uppermost partition member 11 and the top plate 10a of the cartridge receiving box 10. Although in this embodiment each space setting lug 11b is in the shape of a disk, no limitation is made to the shape, provided the lugs 11b can be brought into abutment with each other to maintain the minimum distance. On the upper surface of each partition member 11 is integrally formed a raised pressing portion 11c which has sloped (angled) sides and projects above the plane defined by the partition member 11. When the cartridge C is completely stored on a partition member 11, the pressing portion 11c of the partition member is received in the hole Ca of the cartridge (shown in FIG. 9) and is fitted in a center hole Da of the disk D such that it presses the disk D against the inner surface of the upper wall of the cartridge C.

Figure 8A:
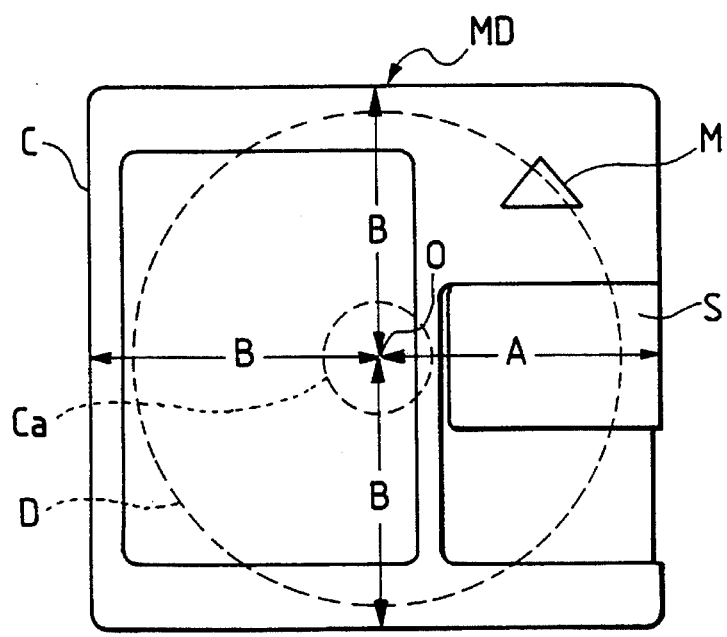
FIG. 8(A) is a plan view of a cartridge and FIG. 8(B) is an end view thereof.

As mentioned previously, the center O of the hole Ca of the cartridge C is located in a position biased to the left-hand side in FIG. 8(A), and therefore the pressing portion 11c of each partition member 11 is formed in a position in which it is received in the cartridge hole Ca only when the cartridge C is properly inserted into any of the receptacle areas A1 to A4.

A biasing spring 12 is interposed between the lowest partition member 11 and the bottom plate 10b of the cartridge receiving box 10. By means of the biasing spring 12, the lowest partition member 11 is urged to pivot in a clockwise direction (as shown in FIG. 1) around the support shafts 11a, which act as fulcrums. The three partition members 11 located above to lowest partition member are successively urged upward either by cartridges C located between adjacent partition members or by mutual abutment of the space setting lugs 11b.

More specifically, as shown in FIG. 3, when the cartridge C is stored in a receptacle area, the pressing portion 11c of the lower partition member 11 is received in the center hole Da of the disk D contained in the cartridge by the biasing force of the biasing spring 12, so that the disk is pushed against the inner surface of the upper wall of the cartridge. In this case, the size of the space setting lug 11b of the upper partition member 11 and that of the lower partition member 11 are each set so that an extremely small gap δ is present between both lugs 11b, that is, both lugs do not come into abutment with each other. Therefore, not only is the disk D pushed against the inner surface of the upper side of the cartridge by means of the pressing portion 11c, but, in addition, the cartridge C itself is pushed against the upper partition member 11. Similarly, the overlying partition members 11 are successively urged upward, whereby the cartridge C stored in the top stage of receptacle area A4 is pushed against the ceiling plate 10a of the cartridge receiving box 10.

When there are no cartridges C in the receptacle areas, adjacent space setting lugs 11b are brought into abutment with each other by the biasing force of the biasing spring 12, and in this case the spacing between partition members 11 becomes slightly narrower by the distance δ than the case in which a cartridge is present. However, the spacing between the partition members 11, when no cartridge is present, is almost equal to the spacing L between partition plates 10d, thus causing no obstacle to the insertion of the cartridge C. Upon such abutment of the space setting lugs 11b, the biasing force of the biasing spring 12 is transmitted to the upper partition member 11 and in this way all the partition members 11 are urged upward. When there is no cartridge C in the uppermost receptacle area A4, the space setting lugs 11b of the top partition member 11 come into abutment with stoppers 10e formed on the ceiling plate 10a of the cartridge receiving box 10.

As shown in FIG. 4, a detection switch 13 is provided on the bottom plate 10b of the cartridge receiving box 10. When a cartridge C is loaded into or removed from any of the receptacle areas A1 to A4, as shown in FIGS. 5 and 6, the bottom partition member 11 pivots such that a front portion of the bottom partition member 11 depresses a button 13a of the detection switch 13, whereupon the switch 13 turns ON.

The operation of this selective disk-drive apparatus will now be described.

Figure 8B:
Figure 9:
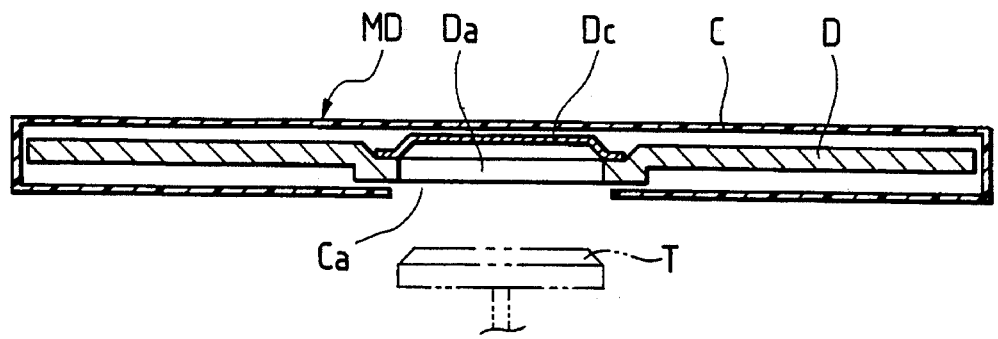
FIG. 9 is a sectional view of the cartridge.

Into the selective disk-drive apparatus is loaded a minidisk (MD) type cartridge C which is shown in FIGS. 2, 8 and 9. When the cartridge C is inserted into the apparatus, the disk driving unit 4 is vertically positioned such the transfer mechanism 7 becomes opposed to the inside of the insertion opening 2a. Upon insertion of the cartridge C through the insertion opening 2a, the cartridge is pulled onto the disk driving unit 4 by the pull-in mechanism contained in the transfer mechanism 7. It is possible to load the cartridge C directly onto the turntable T to playback information stored on the disk contained within the cartridge, but usually the cartridge C is transferred into an empty (unoccupied) receptacle area within the cartridge receiving box 10. This transfer is attained by vertical movement of the disk driving unit 4 until the transfer mechanism 7 is opposed to the empty receptacle area. Then, the cartridge C is pushed into the empty one of the receptacle areas A1 to A4 by the mechanism provided for this purpose within the transfer mechanism 7.

On the other hand, when any of the cartridges thus stored in the cartridge receiving box 10 is selected for playback, the transfer mechanism 7 moves to the position opposed to the receptacle area containing the selected cartridge C and then stops. Thereafter, the cartridge C is pulled out from the interior of the cartridge receiving box 10 by means of the transfer mechanism 7, the centering member Dc of the disk D in the cartridge is fitted on the turntable T, and the disk D is rotated by the spindle motor 4a to perform, for example, a playback operation.

The operation of each partition member 11 in the cartridge receiving box 10 will be described below with reference to FIGS. 4 to 6.

As an example, FIG. 4 shows a state in which cartridges C are stored in the receptacle areas A1 and A3, while the receptacle areas A2 and A4 are empty.

In this state, the bottom partition member is urged upward by means of the biasing spring 12, the pressing portion 11c of the bottom partition member 11 is received within the hole Ca of the corresponding cartridge C to press the disk D against the inner surface of the cartridge upper wall, and the cartridge C itself is pushed against the partition member 11 which is second from the bottom. Since no cartridge C is present in the receptacle area A2, the upward urging force of the second partition member 11 from the bottom is transmitted to the third partition member 11 from the bottom through mutual abutment of the space setting lugs 11b of both partition members. In this way all the partition members 11 are urged upward in FIG. 4, and the space setting lugs 11b of the top partition member 11 are in abutment with the stoppers 10e formed at the ceiling plate 10a of the cartridge receiving box 10.

When a cartridge C is inserted into the receptacle area A4 in the state of FIG. 4, a leading edge of the cartridge contacts and slides over the sloped side of the pressing portion 11c, thereby pivoting the uppermost partition plate 11 counterclockwise around its support shafts 11a, as shown in FIG. 5. The second partition plate 11 from the top is pivoted in the same direction together with the cartridge stored in the receptacle area A3, and the underlying partition member 11 is also pivoted counterclockwise by mutual abutment of the space setting lugs 11b. Likewise, the bottom partition member 11 is pivoted in the same direction, and this motion is detected by the detection switch 13. From this detecting operation of the switch 13 it is determined that the cartridge loading or unloading operation is being performed in the cartridge receiving box 10.

Upon complete insertion of the cartridge C into the receptacle area A4, the pressing portion 11c is received into the opening Ca of the cartridge C, thereby allowing the uppermost partition member 11 to pivot clockwise into a horizontal position. When this occurs, all the partition members 11 are pivoted clockwise into respective horizontal positions by the biasing force of the biasing spring 12. The disk D in the cartridge C which has thus entered the receptacle area A4 is pushed against the inner surface of the cartridge upper wall by the pressing portion 11c of the uppermost partition member 11.

In the event the cartridge should be inserted into any of the receptacle areas A1 to A4 upside-down or in a direction other than the normal insertion direction indicated by mark M (see FIG. 9), the pressing portion 11c of the corresponding partition member 11 cannot enter the hole Ca of the cartridge C. As a result, the partition member 11 does not pivot into its original (horizontal) position against the biasing force of the biasing spring 12, and the detection switch 13 remains ON. In this case, a circuit detects the ON state of the switch 13 and judges that the cartridge has been inserted erroneously, and notifies the user using a display unit provided on the nose portion 2, or using a speaker (not shown), that the cartridge has been inserted in an incorrect direction, thereby urging the user to discharge the cartridge C. Alternatively, the cartridge thus inserted erroneously is discharged forcibly. In this way it is possible to prevent an incorrect loading of the cartridge C.

As shown in FIG. 6, when the cartridge C is inserted into the receptacle area A2 the lower two partition members 11 are pivoted downward in the manner described above. Similarly, when the cartridge C is inserted into the receptacle area A1, as shown in FIG. 1, only the bottom partition member 11 is pivoted downward.

The motion of each partition member 11 when a cartridge is removed from any of the receptacle areas is the same as in FIGS. 4 to 6.

The disks D contained in cartridges C which have been inserted into the receptacle areas A1 to A4 are all pushed against the inner surfaces of the upper walls of the respective cartridges C. Therefore, even under vehicular body vibrations, rattling noise caused by vibration of the disk D contained in each cartridge C is prevented. Further, even in the case where there is no cartridge C in the receptacle areas, the space setting lugs 11b of partition members 11 are kept in abutment with each other, and the lugs 11b of the top partition member 11 is in abutment with the stoppers 10e formed at the ceiling plate 10a of the cartridge receiving box 10. In this state the partition members 11 are urged upward by the biasing spring 12, so that rattling of the partition members is prevented even if vibrations are applied thereto.

In the selective disk-drive apparatus of the structure described above, when the transfer mechanism 7 assumes the position opposed to the receptacle area A1, it is necessary to ensure the height Ha for downward projection of the disk driving unit 4, as shown in FIG. 1. Therefore, the receptacle areas A1 to A4 must be arranged within the remaining height Hb. In the case where the housing 1 is of so-called 1 DIN size and the cartridges used are minidisks (MD), it is possible to arrange four receptacle areas A1 to A4 within the foregoing height Hb. Even when the housing 1 is not of the 1 DIN size, such efficient arrangement of the receptacle areas permits the reduction in size of the housing 1 or an increase in the number of cartridges C received in the cartridge receiving box.

Figure 7:
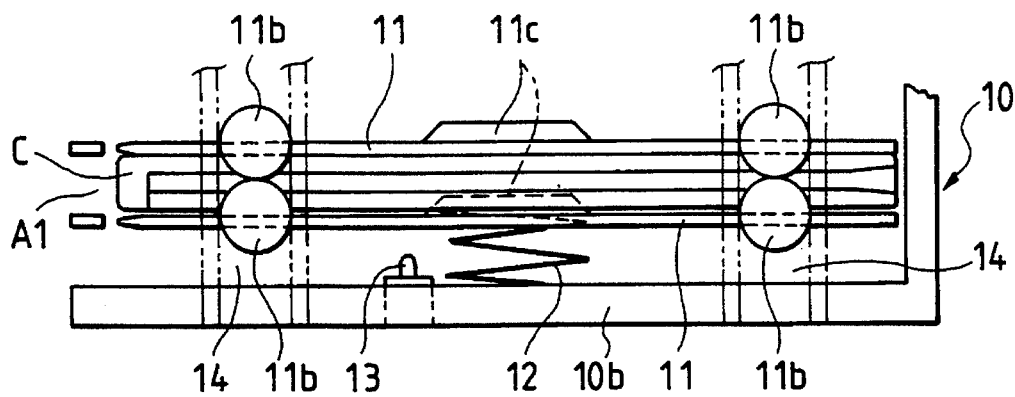
FIG. 7 is a partial side view of a cartridge receiving box in a second embodiment of the present invention.

Referring now to FIG. 7, there is illustrated a second embodiment of the present invention.

In the first embodiment illustrated in FIG. 1 each partition member 11 is adapted to pivot around the support shafts 11a, while in the second embodiment illustrated in FIG. 7 the partition members 11 are translated vertically. More specifically, both side portions of the partition member 11 are provided with two space setting lugs 11b, while in the inner surfaces of both side plates of a cartridge receiving box 10 are formed guide slots 14 for guiding the space setting lugs 11b along a vertical, linear path. The bottom partition member 11 is urged upward by means of a biasing spring 12, and a detection switch 13 is provided on a bottom plate 10b of the cartridge receiving box 10. According to this embodiment, when the loading or unloading operation of a cartridge C is performed, the bottom surface of the cartridge slides over a pressing portion 11c, whereby the underlying partition member 11 is pressed down. At this time, the space setting lugs 11b, 11b move through the guide slots 14, 14 to widen the spacing between partition members 11.

Although in the embodiment illustrated in FIG. 1 all the partition members 11 are urged upward by means of only one biasing spring 12, a spring for urging each partition member 11 clockwise around support shafts 11a may be provided for each partition member.

The front partition plates 10d in the cartridge receiving box 10, which are shown in FIG. 1 for example, may be omitted.

Although in the embodiment illustrated in FIG. 1 the cartridge receiving box 10 having partition members 11 is fixed within the housing 1, the box 10 may be used as a magazine which is loaded into and removed from the housing 1. Even without using the cartridge receiving box 10, stoppers 10e may be formed directly on the upper surface of the housing 1.

Although in the embodiment illustrated in FIG. 1 the disk-drive driving unit 4 having the transfer mechanism 7 is disposed between the nose portion 2 and the cartridge receiving box 10, plural insertion openings 2a may be formed in the nose portion 2 and the cartridge receiving box 10 may be disposed in close proximity to the nose portion 2 so that cartridges C can be inserted from the insertion openings 2a directly into the receptacle areas A1–A4. In this case, the disk driving unit 4 is disposed in the rear portion of the housing 1.

Further, for example in the state shown in FIG. 5 in which the cartridge C in the receptacle area A4 is projecting partially and all of the underlying partition members 11 have turned downward, it is possible to stop such half-projected cartridge C, insert the disk driving unit 4 into the vacant space formed between the cartridge and the underlying partition member 11, then clamp the disk D contained in the cartridge half-projecting from the receptacle area A4, and drive the disk D for playback operation.

According to the present invention, as set forth above, since the cartridge loading or unloading operation for any of the receptacle areas is accompanied by movement of the underlying partition members, the thickness of each receptacle area can be minimized. Therefore, it is possible to form a larger number of receptacle areas in a limited space and utilize the interior space of the housing effectively. Further, since the disk in a cartridge which has been inserted into any of the receptacle areas is secured within the cartridge by the pressing portion, it is possible to prevent rattling of the disk within the cartridge.

What is claimed is:

1. A selective disk-drive apparatus for storing a plurality of disk-containing cartridges, an information bearing disk being rotatably contained in each of the disk-containing cartridges, each information bearing disk having a central hub, and each of the disk-containing cartridges having a wall defining a central opening for accessing the central hub, the selective disk apparatus comprising:

a housing; and a plurality of partition members movably mounted within the housing, the partition members being arranged such that adjacent pairs of the partition members define cartridge receptacle areas therebetween, each of the partition members including a raised pressing portion positioned such that when a disk-containing cartridge is received in an adjacent receptacle area, the raised pressing portion extends through the central opening of the disk-containing cartridge and presses against the central hub of a disk.

2. A selective disk-drive apparatus according to claim 1, wherein each of the partition members includes support shafts rotatably connected to the housing such that the partition members are pivotable relative to the housing.

3. A selective disk-drive apparatus according to claim 1, further comprising a disk driving portion movably contained within the housing, the disk driving portion including a transfer mechanism for loading and unloading the disk-containing cartridges into and from said receptacle areas, wherein the disk driving portion is movable such that the transfer mechanism is positionable opposite any one of said receptacle areas.

4. The selective disk-drive apparatus according to claim 1, wherein each disk-containing cartridge defines a thickness, and each of the plurality of partition members includes space setting members for maintaining a minimum distance between adjacent ones of the partition members, the minimum distance being smaller than the thickness of the disk-containing cartridges.

5. A selective disk-drive apparatus according to claim 4, wherein the plurality of partition members are sequentially arranged in a stack, and a biasing member is disposed to bias a lowermost one of the partition members toward an uppermost one of the partition members.

6. A selective disk-drive apparatus according to claim 5, further including a detection switch positioned below the lowermost partition member for detecting when said lowermost partition member has moved in a downward direction which occurs when a cartridge is loaded into or removed from any one of said receptacle areas.

7. A selective disk-drive apparatus according to claim 4, wherein the housing includes a plurality of vertical guide grooves, and each of the space setting members of each partition member is slidably received in one of the guide grooves such that all of the partition members are slidable in a vertical direction with respect to the housing.

8. A magazine for storing a plurality of disk-containing cartridges, the magazine being receivable within a selective disk-drive apparatus, an information bearing disk being rotatably contained in each of the disk-containing cartridges, each information bearing disk having a central hub, and each of the disk-containing cartridges having a wall defining a central opening for accessing the central hub, the magazine comprising:

a case;

a plurality of partition members movably mounted within the case, the partition members being arranged such that adjacent pairs of the partition members define cartridge receptacle areas therebetween, each of the partition members including a raised pressing portion positioned such that when a disk-containing cartridge is received in an adjacent receptacle area, the raised pressing portion extends through the central opening of the disk-containing cartridge and presses against the central hub of a disk.

9. A magazine according to claim 8, wherein each of the partition members includes support shafts and the partition members are pivotally connected to the case.

10. The magazine according to claim 8, wherein each disk-containing cartridge defines a thickness, and each of the plurality of partition members includes space setting members for maintaining a minimum distance between adjacent ones of the partition members, the minimum distance being smaller than the thickness of the disk-containing cartridges.

11. A magazine according to claim 10, wherein the case includes a plurality of guide grooves, and each of the space setting members of each partition member is slidably received in one of the guide grooves such that all of the partition members are slidable in a direction defined by the guide grooves.

12. The magazine according to claim 9, wherein the plurality of partition members are sequentially arranged in a stack, and a biasing member is mounted on a wall of the case facing a lowermost one of the partition members, the biasing member biasing the lowermost one of the partition members away from the wall.

13. A magazine according to claim 12, further including a detection switch positioned below the lowermost partition member for detecting when said lowermost partition member has moved in a downward direction which occurs when a cartridge is loaded into or removed from any one of said receptacle areas.

14. A selective disk-drive apparatus for storing a plurality of disk-containing cartridges, an information bearing disk being rotatably contained in each of the disk-containing cartridges, each information bearing disk having a central hub, and each of the disk-containing cartridges having a wall defining a central opening for accessing the central hub, the selective disk apparatus comprising:

a housing; and a plurality of partition members movably mounted within the housing, the partition members being arranged in a stack such that adjacent pairs of the partition members define horizontal cartridge receptacle areas therebetween, each of the partition members including a raised pressing portion extending into one of the cartridge receptacle areas, each pressing portion including sloped sides; and a biasing member mounted below the partition members and biasing a lowermost partition member toward an uppermost partition member;

wherein when a disk-containing cartridge is inserted between upper and lower ones of the partition members, the disk-containing cartridge slides over the raised pressing portion of the lower partition member, initially forcing the partition member in a vertically downward direction against a biasing force of the biasing member, until the disk-containing cartridge is inserted such that the raised pressing portion of the lower partition member is received in the central opening of the cartridge.

15. A selective disk-drive apparatus according to claim 14, wherein said apparatus further comprises a disk driving portion including a transfer mechanism for loading and unloading the disk-containing cartridges into and from said receptacle areas, said disk driving portion being vertically movable such that the transfer mechanism is positionable opposite any one of said receptacle areas.

16. A selective disk-drive apparatus according to claim 14, wherein each disk-containing cartridge defines a vertical thickness, and each of the plurality of partition members includes space setting members arranged such that the space setting members of the lowermost partition member abuts the space setting members of a second partition member located immediately above the lowermost partition member, thereby maintaining a minimum distance between the lowermost member and the second partition member, the minimum distance being smaller than the thickness of the disk-containing cartridges.

17. A selective disk-drive apparatus according to claim 14, further comprising a detection switch positioned below the lowermost partition member for detecting when said lowermost partition member has moved in a downward direction which occurs when a cartridge is loaded into or removed from any one of said receptacle areas.

18. A selective disk-drive apparatus according to claim 14, wherein each of the partition members includes support shafts located near one edge and the partition members are connected to the housing such that the partition members pivot relative to the housing around the support shafts.

19. A selective disk-drive apparatus according to claim 14, wherein the case includes a plurality of guide grooves, and each of the space setting members of each partition member is slidably received in one of the guide grooves such that all of the partition members are slidable in a direction defined by the guide grooves.

* * * * *

UNITED STATES PATENT AND TRADEMARK OFFICE
CERTIFICATE OF CORRECTION

PATENT NO. : 5,524,003
DATED : June 4, 1996
INVENTOR(S) : Tatsuhiko Tsuchiya

It is certified that error appears in the above-identified patent and that said Letters Patent is hereby corrected as shown below:

On the title page, item [54], and Col. 1, line 1,

In the Title:

Please delete "WAITH" and insert --WITH--.

Signed and Sealed this

Seventeenth Day of September, 1996

Attest:

BRUCE LEHMAN

*Attesting Officer*  *Commissioner of Patents and Trademarks*